H. BORING.
CHUCK.
APPLICATION FILED APR. 9, 1909.
1,140,567. Patented May 25, 1915.
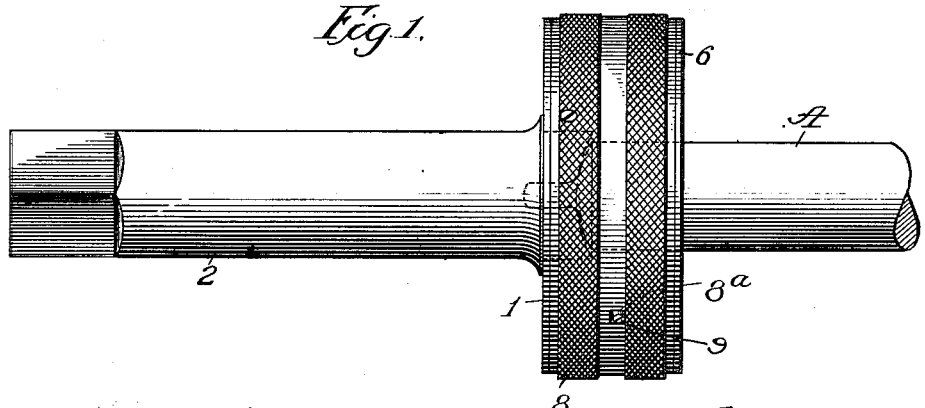
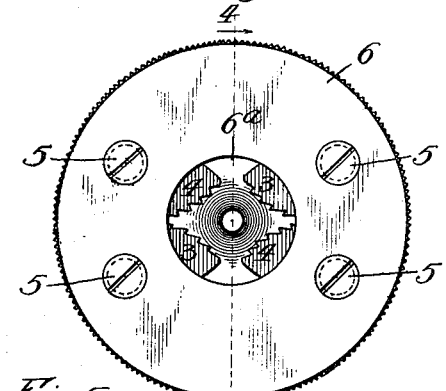
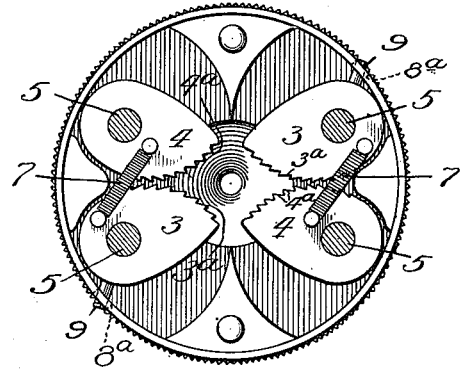
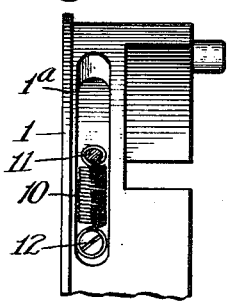
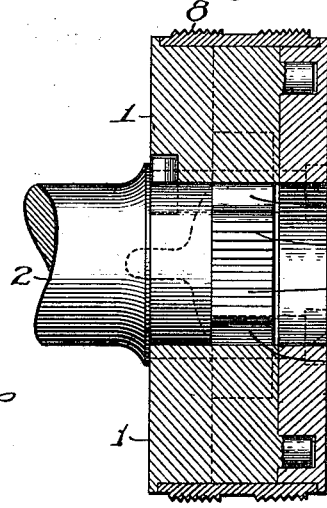
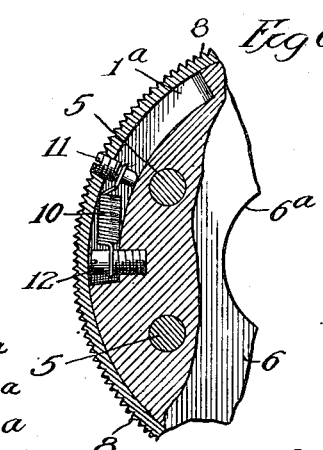
Witnesses:
Fed. G. Davison
Louis B. Erwin
Inventor:
Herbert Boring
By Rector, Hibben & Davis
His Attys.

UNITED STATES PATENT OFFICE.

HERBERT BORING, OF PORTSMOUTH, OHIO, ASSIGNOR OF ONE-HALF TO HERBERT H. HART, OF CHICAGO, ILLINOIS.

CHUCK.

1,140,567.

Specification of Letters Patent.

Patented May 25, 1915.

Application filed April 9, 1909. Serial No. 488,858.

*To all whom it may concern:*

Be it known that I, HERBERT BORING, a citizen of the United States, residing at Portsmouth, in the county of Scioto and State of Ohio, have invented certain new and useful Improvements in Chucks, of which the following is a specification.

My invention relates to chucks and the object thereof is to provide an efficient and reliable device of this character to be used wherever applicable. While in the present instance I employ my chuck for the insertion and removal of stay bolts yet the same without modification may be employed for other purposes and with slight modification may be employed for still other purposes.

The various features of novelty and utility in my chuck will be apparent from the description hereinafter given.

In the drawings Figure 1 is a side elevation of my chuck shown applied to a stay bolt; Fig. 2 an elevation thereof; Fig. 3 a similar view but with the cover plate removed; Fig. 4 a section on the line 4—4 of Fig. 2; Figs. 5 and 6 detail views showing the spring for holding the posts in normal position.

Referring to the present embodiment of my invention as illustrated in the drawings and assuming, without limitation of my invention but for the sake of a clear description, that it is employed as a stay bolt chuck, such chuck comprises a body 1 forming the support or frame for the operating parts and provided with a shank 2 which is engaged by a motor of any desired character for the rotation of the chuck. On the outer or end face of the chuck body or support are mounted a plurality of oscillating eccentric grips or jaws which are here four in number arranged in two pairs 3, 3 and 4, 4, the members of each pair being oppositely disposed from the common center which is the axis of rotation so as to secure maximum strength inasmuch as the transmitting strain or pull is equal on the jaws. These jaws are preferably in the form of cams provided on their engaging sides with serrations or teeth 3ª and 4ª adapted to engage the stay bolt or other object inserted in the chuck. These cam jaws are so related to each other and the teeth are so inclined that only one pair of jaws is active or in engagement with the object at any one time according to the direction of rotation of the chuck. That is to say when the chuck is operated in one direction one pair of the cam jaws is active but if the chuck is operated in the reverse direction the other pair of cam jaws becomes active, the change in action being brought about during the reversal of movement of the chuck in the manner hereinafter explained and the one pair of jaws not interfering with the other either during action or change of action. In the present instance the cam jaws are pivoted upon the fastening screw bolts 5 which serve to secure the cover plate 6 to the body or support of the chuck, it being understood that this cover plate is provided with a central opening 6ª into which the stay bolt or other object to be clamped is inserted. As shown in Fig. 3 the adjacent members of the different pairs of cam jaws are connected with a yielding operating connection which in the present instance consists of a coiled spring 7 connected to the cam jaws in such position with respect to their points or pivots of oscillation that movement of one pair of cam jaws, for instance a movement away from the axis of rotation and clear of the opening 6ª, will cause a corresponding movement or oscillation of the other cam jaws but in a reverse direction.

The cam jaws are held in a normally closed position as illustrated in Figs. 2 and 3 and are controlled in their opening and closing movements by means of a sleeve 8 having a partial rotation or oscillatory movement upon the body or support of the chuck. This sleeve is provided at diametrically opposite points with openings or holes 8ª through which extend projections or pins 9 from the two cam jaws 3. As a result of this construction the partial rotation of the sleeve in one direction as for instance a clockwise movement (Fig. 3), will cause an opening of all of the jaws and a movement in the opposite direction will cause a closing of such jaws. This sleeve is held in a normal position by means of the coiled spring 10 which for sake of compactness is embedded in a recess 1ª in the body of the chuck and connected at one end to a pin 11 on the sleeve and at the other end to a pin 12 secured to said body.

In practice assuming that the chuck is to be used as a stay bolt chuck, the jaws are first opened by oscillating the sleeve 8 to permit the insertion of the stay bolt A whereupon the sleeve is released and the jaws permitted to engage the stay bolt. Assuming also that the shank 2 is connected to a motor and the chuck driven thereby, two of the four cam jaws will engage the stay bolt according to the direction of rotation, for instance if the chuck is being driven in a clockwise direction according to the illustration of Fig. 3 the pair of jaws 4 are the active ones. If, in this rotation, the stay bolt is being inserted and it is now desired to remove such stay bolt the movement of the motor is merely reversed whereupon the cam jaws 4 are released from their engagement and other jaws 3 immediately take hold of the stay bolt. By preference, the body of the chuck where it is entered by the stay-bolt is provided with a somewhat conical-shaped socket wherein the stay-bolt has a tendency to center itself.

By the use of my invention I provide a comparatively simple but very efficient, reliable and compact chuck for all general purposes, particularly for stay bolts, the chuck being capable of gripping an object by rotation in either direction.

While in the present instance I have shown a chuck with a shank adapted to be inserted in the socket or the like of a motor, yet it will be understood that the chuck may be used for somewhat different purposes by simple modifications, as for instance it may be employed to act as a chuck upon long rods, in which event the body of the chuck as well as the shank will be provided with a central bore or opening into or through which such rod may pass, all of which is obvious from the illustration and the description already made.

I claim:

1. A chuck comprising a frame or support, a pair of jaws arranged to oscillate therein and adapted to grip an object and rotate it in one direction, and a second pair of jaws also arranged to oscillate therein and adapted to grip an object and rotate it in the opposite direction, a member of one pair being yieldingly connected with the corresponding member of the other pair.

2. A chuck comprising a frame or support, a pair of jaws arranged to oscillate therein and adapted to grip an object and rotate it in one direction, and a second pair of jaws also arranged to oscillate therein and adapted to grip an object and rotate it in the opposite direction, and springs connecting adjacent members of the two pairs.

3. A chuck comprising a frame or support, pairs of oppositely acting oscillating jaws for gripping an object and rotating the same in either direction, means for oscillating said jaws in unison for releasing them from their gripping engagement, and means for holding the jaws to a gripping position with a yielding pressure.

4. A chuck comprising a frame or support, pairs of oppositely acting jaws arranged to oscillate therein for gripping an object and rotating the same in either direction, said jaws being normally held to a gripping position with a yielding pressure, and means for operating the jaws to a non-gripping position.

5. A chuck comprising a frame or support, pairs of oppositely acting and oscillatory jaws for gripping an object and rotating the same in either direction, said jaws being normally spring-pressed to gripping position, and means for operating the jaws to a non-gripping position.

6. A chuck comprising pairs of oppositely acting oscillatory jaws for gripping an object and rotating it in either direction, and springs each connecting two adjacent jaws.

7. A chuck comprising a frame, pairs of oppositely acting jaws arranged to oscillate in the frame for gripping an object and rotating it in either direction, and an oscillating sleeve coöperating with one member of each pair of jaws and arranged to move them to a non-gripping position.

8. A chuck comprising a frame or support, pairs of oppositely acting jaws arranged to oscillate therein for gripping an object and rotating the same, one pair of jaws being adapted to rotate it in one direction and the other pair for rotating it in the opposite direction, an oscillating sleeve operatively connected with the members of one pair of jaws for oscillating and moving them to a non-gripping position, and an operating connection between the members of the other pair of jaws and the adjacent members of the first-named pair.

9. A chuck comprising a frame or support, pairs of oppositely acting jaws arranged to oscillate therein for gripping an object and rotating the same, one pair of jaws being adapted to rotate it in one direction and the other pair for rotating it in the opposite direction, an oscillating sleeve operatively connected with the members of one pair of jaws for oscillating and moving them to a non-gripping position, and springs operatively connecting the members of the other pair of jaws with the adjacent members of the first-named pair.

10. A chuck comprising a frame or support, pairs of oppositely acting jaws arranged to oscillate therein for gripping an object and rotating the same, one pair rotating it in one direction and the other pair rotating it in the opposite direction, a sleeve mounted to oscillate upon said support and operatively connected with the members of one pair of jaws, said sleeve being spring-pressed in the direction to normally cause gripping action, and operating connections between the pairs of jaws.

11. A chuck comprising a frame or support, pairs of oppositely acting jaws arranged to oscillate therein for gripping an object and rotating the same, one pair rotating it in one direction and the other pair rotating it in the opposite direction, a sleeve mounted to oscillate upon said support, the members of one pair of jaws having projecting pins engaged by said sleeve and the sleeve being spring-pressed in a direction to move the jaws to gripping position, and a spring connection between the corresponding members of the pairs of jaws.

12. A chuck comprising a frame or support, pairs of oppositely acting jaws arranged to oscillate therein for gripping an object and rotating the same, one pair rotating it in one direction and the other pair rotating it in the opposite direction, a sleeve mounted to oscillate upon said support and having transverse openings, the members of one pair of jaws having pins received by said openings and the sleeve being spring-pressed in a direction to move the jaws to gripping position, and a spring connection between the corresponding members of the pairs of jaws.

13. A chuck comprising a frame or support, jaws mounted in pairs on the support for oscillation, an annulus mounted upon the support surrounding the jaws and adapted for partial rotation with reference to the support, radial pins on two opposite jaws extending through openings in the annulus whereby rotation of the annulus will operate the jaws.

14. A chuck comprising a body, a pair of jaws pivoted to the body and adapted to grip an object when the chuck is rotated in one direction and an independently pivoted pair of jaws adapted to grip the object when the chuck is rotated in the opposite direction, and a spring connection between corresponding members of the different pairs of jaws.

15. A chuck comprising a body having a shank integral therewith, a pair of jaws pivoted to the body and adapted to grip an object when the chuck is rotated in one direction and a second pair of jaws independently pivoted to the body and adapted to grip the object when the chuck is rotated in the opposite direction and means for oscillating the jaws simultaneously to open them.

16. A chuck comprising a body, a shank rigidly secured thereto, a pair of jaws pivoted to the body and adapted to grip an object when the chuck is rotated in one direction and an additional pair of jaws separately pivoted adapted to grip an object when the chuck is rotated in the other direction, the jaws of one pair alternating with the jaws of the other set, the adjacent jaws of the two pairs being yieldingly connected together in pairs, and means for oscillating the jaws simultaneously to open them.

17. A chuck comprising a body, a shank rigidly secured thereto, a pair of jaws pivoted to the body and adapted to grip an object when the chuck is rotated in one direction and an additional pair of jaws separately pivoted adapted to grip an object when the chuck is rotated in the other direction, the jaws of one pair alternating with the jaws of the other pair, the adjacent jaws of the two pairs being yieldingly connected together in pairs.

HERBERT BORING.

Witnesses:
 EMMA JOHNSTON,
 ARTHUR H. BANNON.